(12) United States Patent
Ranganathan et al.

(10) Patent No.: US 9,729,633 B2
(45) Date of Patent: Aug. 8, 2017

(54) DISTRIBUTED DATA PROCESSING SYSTEM

(71) Applicant: Microsoft Technology Licensing, LLC, Redmond, WA (US)

(72) Inventors: Bhalakumaaran Erode Ranganathan, Bellevue, WA (US); Lan Tang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 255 days.

(21) Appl. No.: 14/726,401

(22) Filed: May 29, 2015

(65) Prior Publication Data
US 2016/0352596 A1     Dec. 1, 2016

(51) Int. Cl.
    *G06F 15/173*     (2006.01)
    *H04L 29/08*      (2006.01)
    *H04L 12/26*      (2006.01)
    *H04L 12/24*      (2006.01)

(52) U.S. Cl.
    CPC ...... *H04L 67/1097* (2013.01); *H04L 43/0805* (2013.01); *H04L 41/0856* (2013.01)

(58) Field of Classification Search
    USPC ................... 709/203, 223, 224, 217
    See application file for complete search history.

(56) References Cited

U.S. PATENT DOCUMENTS

| | | | |
|---|---|---|---|
| 5,226,118 A * | 7/1993 | Baker | G05B 23/0232 345/440 |
| 6,463,532 B1 | 10/2002 | Reuter et al. | |
| 7,076,553 B2 | 7/2006 | Chan et al. | |
| 7,555,559 B2 | 6/2009 | Chapweske | |
| 7,630,944 B2 | 12/2009 | Rupp et al. | |
| 7,890,755 B2 * | 2/2011 | Schnackenberg | G06F 21/57 709/220 |
| 8,005,888 B2 | 8/2011 | Lamport | |
| 8,104,043 B2 | 1/2012 | Padisetty et al. | |
| 8,150,914 B1 | 4/2012 | Taneja et al. | |
| 8,527,618 B1 | 9/2013 | Wiese | |
| 8,549,364 B2 | 10/2013 | Ziskind et al. | |

(Continued)

OTHER PUBLICATIONS

Gonzalez-Ruiz, et al., "Distributed Load Balancing over Directed Network Topologies", In Proceedings of American Control Conference, Jun. 10, 2009, 7 pages.

*Primary Examiner* — El Hadji Sall

(57) ABSTRACT

To coordinate distributed processing of the data files specified for the run by the set of analysis computers, the analysis computers and an analysis management computer are each configured to follow a convention regarding how the run is specified and performed. The convention includes the timing of when each run begins and ends, and the specification of the data files to be included in the run, and the identification of the analysis computers available for the run. The analysis management computer provides a mechanism through which the set of data files to be processed, and a state of processing of those files, can be communicated with available analysis computers. The analysis computers communicate their availability to participate in the run through the analysis management computer and receive information enabling each analysis computer to determine its own partitions of the set of data files to process.

20 Claims, 9 Drawing Sheets

(56) References Cited

U.S. PATENT DOCUMENTS

| | | |
|---|---|---|
| 8,549,536 B2 | 10/2013 | Vasil et al. |
| 8,667,065 B1 | 3/2014 | Odom |
| 8,910,176 B2 | 12/2014 | Lindsay et al. |
| 2005/0149903 A1 | 7/2005 | Archambault et al. |
| 2008/0059489 A1 | 3/2008 | Han et al. |
| 2014/0280372 A1 | 9/2014 | Huras et al. |

* cited by examiner

Directory 200
    list of data files 202
    file for computer-1 204
    file for computer-2 204
    . . .
    file for computer-N 204

FIG.2

List of Data Files 300
    File-1 302
        path name 304
        file name 306
        download state 308
        processed state 310
    File-2 302
        . . .
    . . .
    File-N 302

FIG.3

DISTRIBUTED DATA PROCESSING SYSTEM

BACKGROUND

One kind of distributed data processing application involves having multiple computers process a large number of data files accessed from a single source. An example of such an application arises in analyzing data from server logs. A server computer generates one or more logs of activity occurring on the server computer. Such logs are data files stored on the server computer. In a data center with many such server computers, the logs from multiple server computers are periodically copied from the server computers to another storage system, from which the logs can be accessed for analysis. Typically, given the volume of data in such server logs, multiple computers are used to analyze the data. Each computer accesses and processes a subset of the data files from the storage system.

SUMMARY

This Summary is provided to introduce a selection of concepts in a simplified form that are further described below in the Detailed Description. This Summary is intended neither to identify key or essential features, nor to limit the scope, of the claimed subject matter.

To analyze data stored in a large number of data files, a set of the data files is specified for a set of analysis computers to process over a period of time. The analysis computers are each assigned a partition of the set of data files to analyze. The processing to be performed by the set of analysis computers on the set of data files over the period of time is called a run.

To coordinate distributed processing of the data files specified for the run by the set of analysis computers, the analysis computers and an analysis management computer are each configured to follow a convention regarding how the run is specified and performed. The convention includes the timing of when each run begins and ends, the specification of the data files to be included in the run, and the identification of the analysis computers available for the run. The analysis management computer provides a mechanism through which the set of data files to be processed, and a state of processing of those files, can be communicated with available analysis computers. The analysis management computer also provides a mechanism through which the analysis computers can communicate their availability to participate in the run and through which each analysis computer can receive information enabling each analysis computer to determine its own partition of the set of data files to process.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DESCRIPTION OF THE DRAWINGS

FIG. 2 is a diagram of an example data structure for a file list.

FIG. 3 is a diagram of an example data structure for a directory of file names.

DETAILED DESCRIPTION

Figure 1:
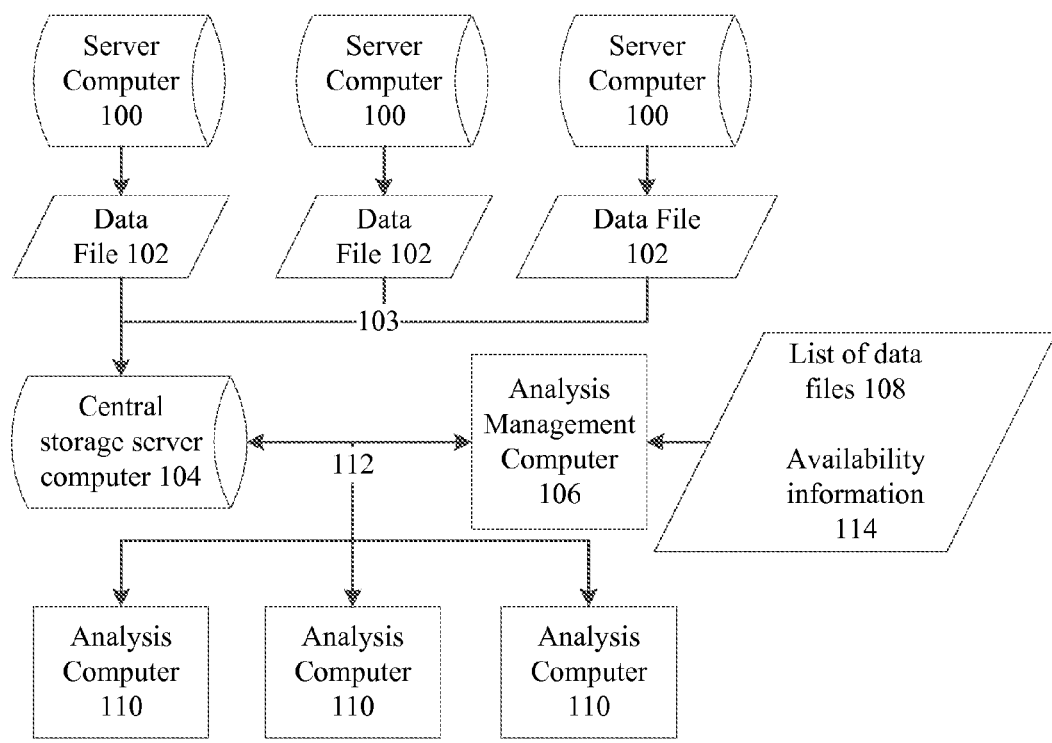
FIG. 1 is a block diagram of an example implementation of a distributed data processing system.

Referring to FIG. 1, an example implementation of a distributed data processing system will now be described.

In FIG. 1, in a system with a plurality of server computers 100, each server computer generates one or more data files 102. A data file can be, for example, a log of activity occurring on the server computer. For example, each server computer of the plurality of server computers 100 can be in a data center that hosts, for example, websites, data analysis platforms, software-as-a-service applications, for multiple users to access over the Internet (not shown). Periodically, each server computer is configured to upload one or more data files 102 to a central storage server computer 104 over a computer network 103. For example, in a data center housing a large number of server computers 100, data files 102, such as server computer log files, from each of the server computers can be uploaded over an internal computer network 103 to the central storage server computer 104.

Analysis computers 110 are configured to access the central storage server computer 104 to access these data files for analysis. To analyze data stored in a large number of data files, a set of the data files is specified for a set of analysis computers to process over a period of time. The analysis computers are each assigned a partition of the set of data files to analyze. The processing to be performed by the set of analysis computers on the set of data files over the period of time is called a run. In one example implementation, an analysis management computer 106 may define runs of analytical operations to be performed on a set of data files on the central storage server computer 104. To analyze data stored in a large number of data files, a set of the data files is specified for a set of analysis computers to process over a period of time. The analysis computers are each assigned a partition of the set of data files to analyze. The processing to be performed by the set of analysis computers on the set of data files over the period of time is called a run. For purposes described in more detail below, in this example implementation, the analysis management computer 106 specifies a list 108 of data files to be used in each run. The list 108 can be stored on the analysis management computer 106, the central storage server computer 104 or other computer accessible by the plurality of analysis computers 110.

The analysis computers 110 analyze the data files specified for each run. The analysis computers communicate with the central storage server computer 104 and the analysis management computer 106 over a computer network 112.

Despite being shown as one computer network 112 in FIG. 1, the computer network 112 can include separate computer networks for communicating between the analysis computers 110 and central storage server computer 104, on the one hand, and between the analysis computers 110 and the analysis management computer 106, on the other hand. A separate computer network also can connect the central storage server computer 106 to the analysis management computer 106. Computer networks 103 and 112 typically are physically separate computer networks, but can be the same computer network.

The analysis management computer 106 can include any computer and/or shared storage system, such as a shared drive, which is used, as described below, to coordinate sharing of information about each run among the analysis computers 110. The analysis management computer 106 thus can include one or more computers and/or one or more shared storage systems. The analysis management computer 106 can include one of the analysis computers 110 if the analysis computer 110 is programmed to also set up runs and/or configure storage for sharing information among the analysis computers 110. The analysis management computer 106 can include the central storage server computer 104 if the computer 104 is programmed to also set up runs and/or configure storage for sharing information among the analysis computers 110.

As described in more detail below, each analysis computer 110 communicates its availability to participate in a run. Given the available analysis computers for a particular run, each analysis computer determines its own partition of the list 108 of data files which it in turn downloads from the central storage server computer 104. Each analysis computer 110 performs the specified analysis on its partition of data files. The specified analysis to be performed by each analysis computer on its partition of data files from the central storage server computer can be any kind of analysis that lends itself to partitioning of data sets and parallel processing of those partitions by multiple analysis computers.

Analysis computers can become available or unavailable at any time. For example, analysis computers can be added to or removed from the distributed processing system. An analysis computer may become offline due to a failure condition, or may become online due to recover from a failure condition. An analysis computer may become unavailable for a run due to processing it is performing, or may become available for a run after completion of processing of data from another run.

In this example implementation, each of the computers 100, 104, 106 and 110 can be implemented using a computer, such as described below in connection with FIG. 9, which is configured by one or more computer programs to implement the functionality described herein. Analysis computers 110 can be implemented using available capacity on a computer on a computer network which provides access to the analysis management computer and the central storage server computer.

To coordinate distributed processing of the data files specified for a run by the analysis computers 110, the analysis computers 110 and the analysis management computer 106 are each configured to follow a convention regarding how each run is specified and performed. The convention includes the timing of when each run begins and ends, the specification of the data files to be included in the run, and the identification of the analysis computers available for the run. An example implementation of this convention is provided in more detail below. The analysis management computer 106 provides a mechanism through which the set of data files to be processed, and a state of processing of those files, can be communicated with the analysis computers 110. The analysis management computer 106 also provides a mechanism through which the analysis computers 110 can communicate their availability to participate in the run and through which each analysis computers 110 can receive information enabling each analysis computer to determine its own partition of the set of data files to process. For example, each analysis computer can determine its rank among the set of analysis computers available to participate in the run, and select a partition of the set of data files based on its rank.

In such a system, each run to be performed on a set of data files is set to occur at a specified time T. As used herein, "T" represents the time at which a current run is to start and "run T" is used to refer to the run that starts at time "T". "T−i" or "T+i" signifies the time at which a previous (T−i) run or subsequent run (T+i) starts, and "run T−i" or "run T+i" is used to refer to the run that started at time "T−i" or "T+i", as the case may be. In some implementations, each analysis computer and the analysis management computer can have an internal time of day clock synchronized to a standard time such as UTC.

Given that runs are specified to occur at known times T, given a time T, the analysis management computer 106 stores a list 108 of data files for the run. Also, the analysis management computer 106 receives and stores, from each analysis computer 110 available to participate in a run T, information 114 about that analysis computer 110. Each analysis computer 110 also can request from the analysis management computer 106 the information 114 of available analysis computers for a run T, and the list 108 of data files for the run.

In one implementation, the information 114 about each analysis computer 110 participating in a run T is in the form of a file written by the analysis computer 110 to a known directory for run T that is managed by the analysis management computer 106. The file can be empty, e.g., zero bytes, and can have a file name that is unique to the analysis computer writing that file. A file containing the list 108 of data files to be processed in run T also can be stored in this directory.

Referring to FIGS. 2 and 3, example data structures that can be used in this implementation will now be described. In FIG. 2, a directory 200 in a file system is provided for each run T. A path and name of the directory can be established based on a known function of the time T. Within the directory, a list 202 of data files to be processed during run T can be stored as a data file. A name for the file storing this list 202 can be defined by a convention used by the analysis management computer 106 and the analysis computers 110. The directory also includes a number of additional zero byte files 204, each with a unique file name as written by the analysis computers 110.

As described in more detail below, at the beginning of a run T, analysis computers begin writing such zero byte files to the directory specified for the run. After passage of a period of time, each analysis computer then can read a list of the files written to this directory to determine a number of analysis computers available to participate in the run, and to determine its rank in that list. Each analysis computer can used its determined rank to define its own partition of the data files to be processed.

In FIG. 3, an example structure of the list 202 of data files, for the data in that list as stored in a data file, will now be described. A file list 300 includes a large list of files 302 to be processed. For each file 302, various information about the file can be stored. In this example, the file list includes, for each file, a path name 304 and file name 306. The path name provides a directory on the central storage server computer 104. The file name is a name of a file to be downloaded and processed. Additional state information for each file can be stored. For example, a download state 308 can be stored as an indication of whether the file has been successfully downloaded by an analysis computer. A processed state 310 can be stored as an indication of whether the file has been successfully processed by the analysis computer that downloaded the file. An indication of the analysis computer that downloaded and processed the file also can be stored. Any other information the analysis management computer may wish to store about a file or about a run can be stored in this file or in a related file or in a database. For example, the analysis management computer can store information describing the processing to be performed on the files for the run.

The foregoing example implementation of the list of data files for processing and the information about each analysis computer is written to files in a directory specified for a run T. Any other form of storage of the information specifying the files to be processed in a run, and for each analysis computer to communicate its availability for a run and to access information about the set of analysis computers available for the run, can be used.

Referring now to FIGS. 4 through 8, more details of an example implementation using the data files of FIGS. 2 and 3 will now be described.

Figure 4:
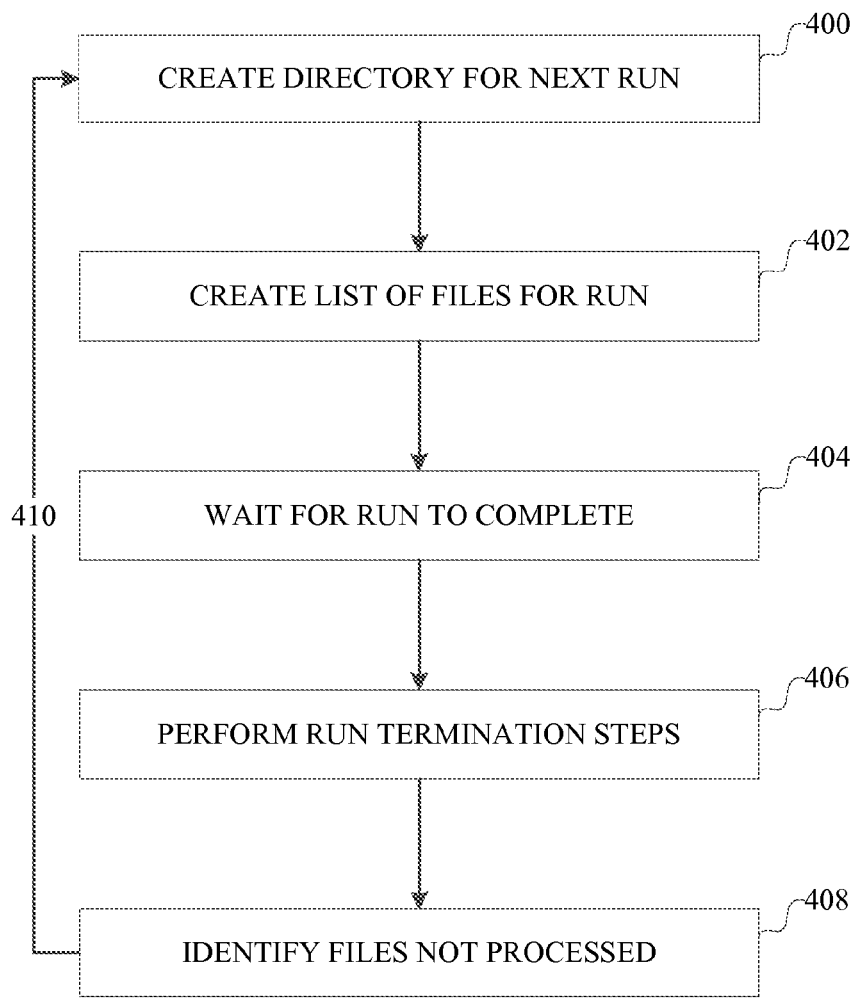
FIG. 4 is a flow chart illustrating an example of operation of a distributed data processing system.

In this example, prior to the start time T for a run T, an analysis management computer 106 creates 400 a next directory for the run T. Within this directory, the analysis management computer stores 402 a list of data files to be processed during run T. After the start time for run T, the analysis management computer 106 then waits 404 for a period of time allotted for the run T to occur. After the run T occurs, the analysis management computer can perform 406 any run termination steps, such as analyzing any state information in the data files regarding the successful download and processing of the data files by the analysis computers. For example, any files that were not successfully downloaded, or not successfully processed, can be identified 408 if such state information is maintained. Such files can be included for analysis in another run. As shown in FIG. 4, this process repeats for the next run, as indicated at 410. However, some processing steps by the analysis management module for a run T can extend past the start time for run T+1; multiple processes can be executed on an analysis management module for running different runs. The analysis management module also can set up multiple runs ahead of their start times, and analyze results of multiple runs after their end times.

Figure 5:
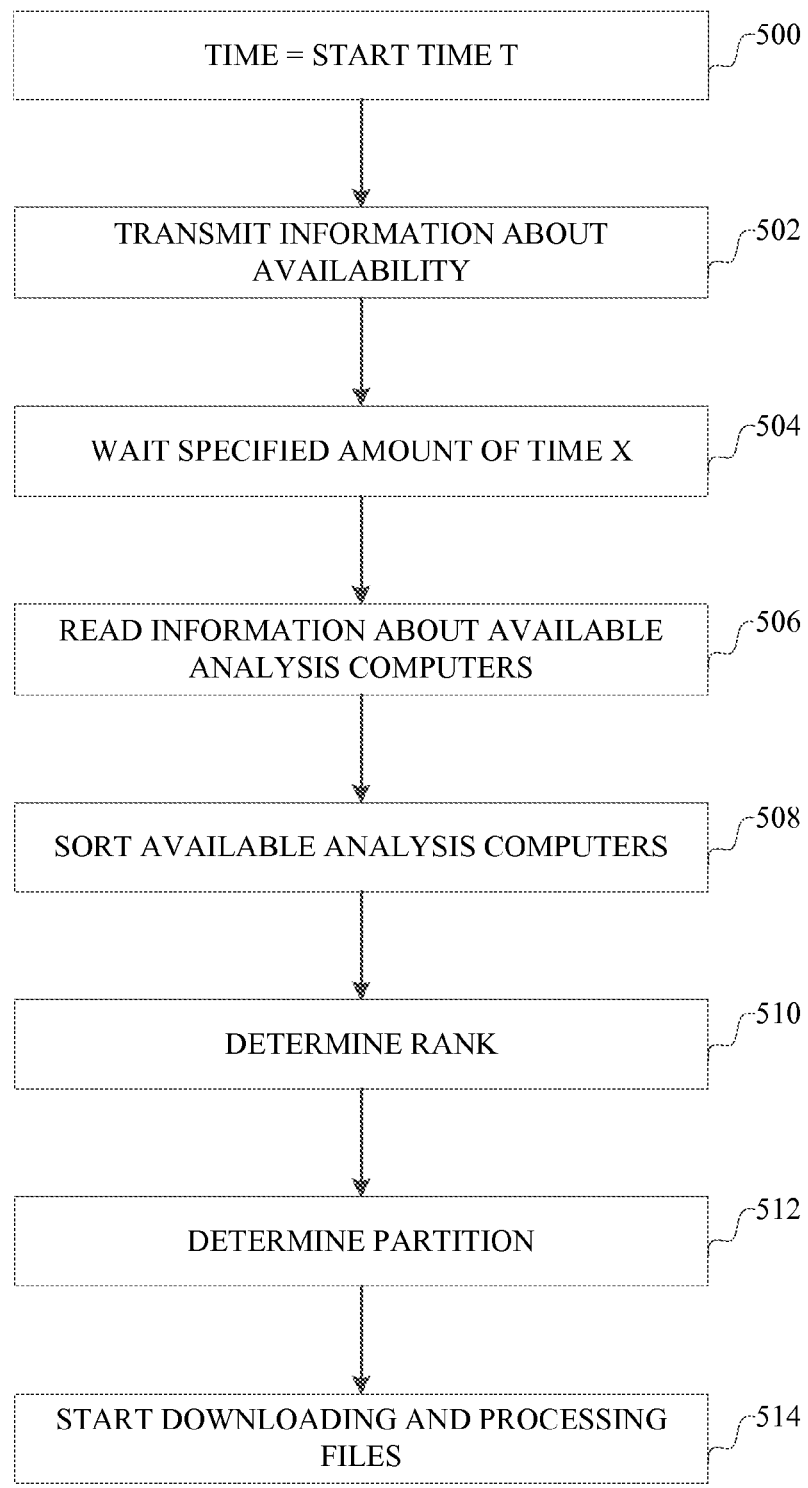
FIG. 5 is a flow chart illustrating an example implementation of operation of a computer participating in the distributed data processing system to copy a partition of files indicated in a file list.

Referring now to FIG. 5, an example operation of an analysis computer available to participate in a run will now be described.

In the process of FIG. 5, the analysis computer is available to participate in a run and had scheduled a time at which to begin participating in the run. In some instances, when an analysis computer first becomes available, it can determine whether to participate in any current run after synchronizing its timing with the analysis management computer.

The analysis computer 110 is configured to start this process at a designated time (the start time T for run T), for example by scheduling an interrupt. When the current time is the start time T, as determined at 500, the analysis computer transmits 502 its information to the analysis management computer, for example by writing a zero-byte data file with a unique name to the directory for the run T.

In one implementation, the analysis management computer can be configured to limit the number of analysis computers and/or limit the number of files downloaded per analysis computer to optimize parallelization of processing.

The analysis computer then waits 504 for a specified period of time X. This waiting period is designed to allow available analysis computers to complete their transmissions of information to the analysis management computer. After the period of time X passes, the analysis computer reads 506 the information from the analysis management computer about the available analysis computers. For example, it can perform a directory read operation on the directory for run T to list the files stored by the available analysis computers in that directory. From the information about the available analysis computers for this run T, the analysis computer then sorts 508 the information, from which the analysis computer determines 510 its rank from among the set of analysis computers.

Given a rank from among a set of analysis computers available for a run T, an analysis computer determines 512 a partition of the set of data files to be downloaded and processed for the run T. The partition can be determined in a number of ways as a function of the rank of the analysis computer. For example, given a rank R of an analysis computer among a set of S analysis computers, the analysis computer can select a data file at an offset of R from every Sth data file in a list of data files. Any function that maps rank R is a set of size S to unique indices into the list of data files can be used.

Given its partition of the set of data files for run T, the analysis computer then starts 514 to download and process the data files in its partition, which will now be described in more detail in connection with FIG. 6.

Figure 6:
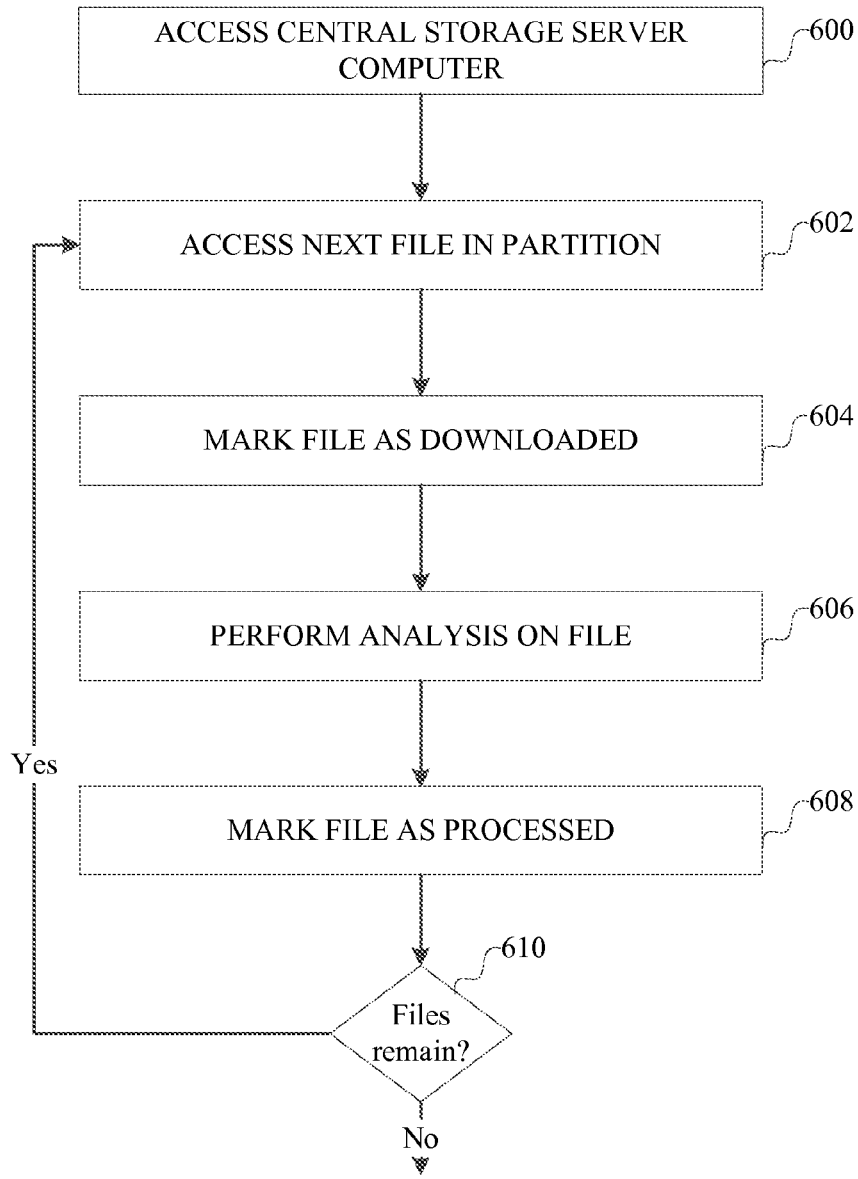
FIG. 6 is a flow chart illustrating an example implementation of operation of a computer participating in the distributed data processing system to update a file list.

As shown in FIG. 6, the analysis computer accesses 600 the central storage server computer, and performs any authentication with the central storage server computer. If the central storage server computer is accessible, the analysis computer downloads 602 a next file in its partition to local storage of the analysis computer. If the download completes successfully, the analysis computer can mark 604 this file as downloaded in the list of data files maintained by the analysis management computer. The analysis computer then can process 606 the downloaded file. In some implementations, the processing of each downloaded file can occur after multiple files are downloaded. After successfully processing a downloaded data file, the analysis computer can mark 608 this file as processed in the list of data file maintained by the analysis management computer. So long as files remain in the partition for this analysis computer, as determined at 610, the analysis computer can continue to download and process the files, as indicated at 612.

In the event that an analysis computer fails, or that processing fails, or that a download fails, or that the analysis computer is unable to connect with the central storage server computer, or if any other error occurs, the list of data files is not updated at the analysis management computer to reflect successful processing of the data in the partition for that analysis computer. Further, the analysis management computer has information allowing it to determine which analysis computer did not process its partition.

Figure 7:
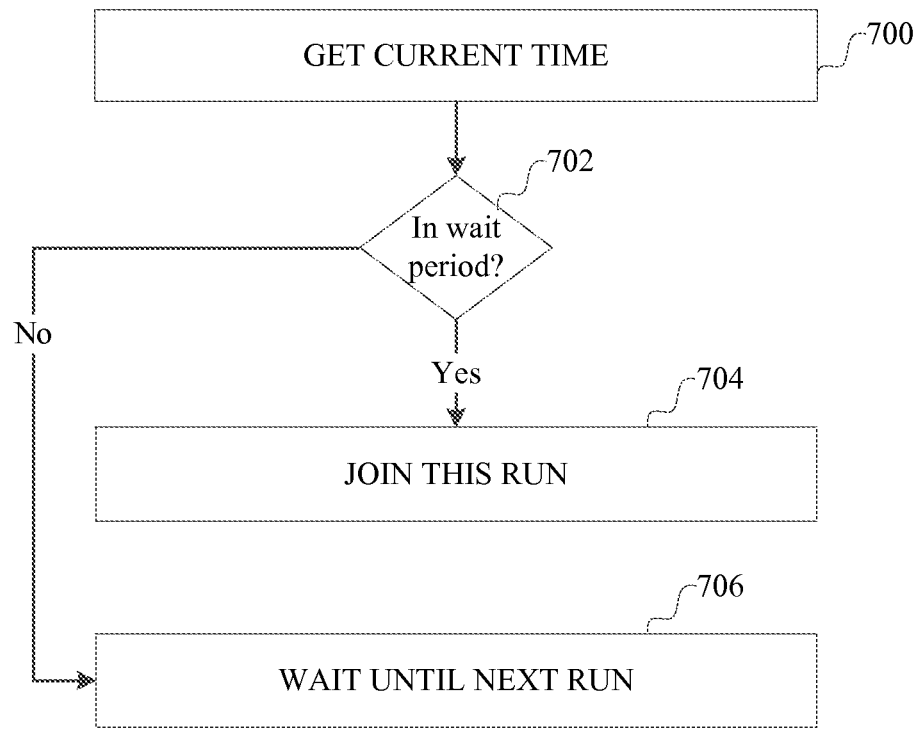
FIG. 7 is a flow chart illustrating an example implementation of operation of a computer participating in the distributed data processing system to initiate participating in the distributed data processing system.

As shown in FIG. 7, to prepare to be available to participate in runs, the analysis computer first determines 700 a current time. This may involve setting its time to a standard time or obtaining a system time from an analysis management computer or another source. The analysis computer then compares 702 the current time to a schedule of known run times and known wait periods at the beginning of each run time (see 504 in FIG. 5). For example, run times can be specified to occur every twenty (20) minutes starting at the beginning of each hour, with a wait time of five (5) minutes at the beginning of each run. The current time is compared to time frames (described here in hours, minutes and seconds as HH:MM:SS) defined by the run time specifications, e.g., if the current time is within the time frames HH:00:00 and HH:04:59, HH:20:00 and HH:24:59, or HH:40:00 and HH:44:59, then the analysis computer can join 704 a current run. Otherwise, the analysis computer waits 706 for the next run, for example by scheduling an interrupt to participate in the next run.

Given such an implementation, an example timeline of operation of multiple analysis computers to participate in runs will now be described in connection with FIG. 8.

Figure 8:
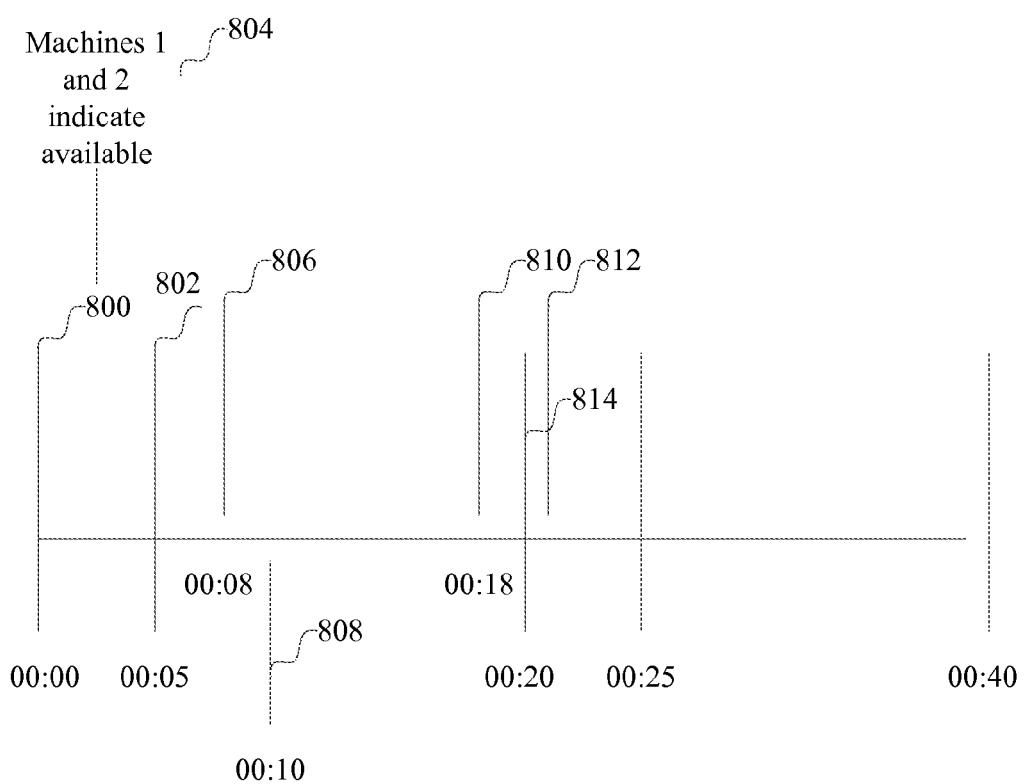
FIG. 8 illustrates a timeline describing operation of the distributed data processing system.

In FIG. 8, at time 00:00 (800), a run T begins. During the period through time 00:05, analysis computers can communicate with the analysis management computer to indicate their availability, as shown at 804. At time 00:05 (802), available analysis computers read the information about all of the available analysis computers. After time 00:05, through an end of the run as indicated at 00:20 (814), the analysis computers download files in their respective partitions. In the example in FIG. 8, machine 1 completes a download of file 1 (806) at 00:08, and of file 2 (810) at 00:18, but cannot complete download of file 4 (812) before the end of the run (814). In contrast, machine 2 completes a download of file 3 (808) at 00:10 and is idle the remaining time of the run. Machines 1 and 2 may participate in the next run, but other machines may participate as well. Machines 1 and 2 might be unavailable to participate in the next run if they are still performing data processing tasks on the files downloaded in the current run. If files are approximately the same size, evenly partitioning the files among the available machines can reduce idle times and increase the number of completed downloads. The duration of each run and number of files to be downloaded by each analysis computer can be adjusted to increase the likelihood of completed downloads and processing of the data in each run.

In such a distributed data processing system, by having analysis computers communicate their availability to participate in run and determine their own partition of the data set to be processed, a variety of advantages are achieved. Analysis computers can be readily added and removed from the data processing system providing scalability. Further, use of another computer to monitor available computers, partition a set of data files, assign processing jobs to available computers, and balance load is avoided. These results are instead an effect that emerges from the independent operations of the analysis computers.

Figure 9:
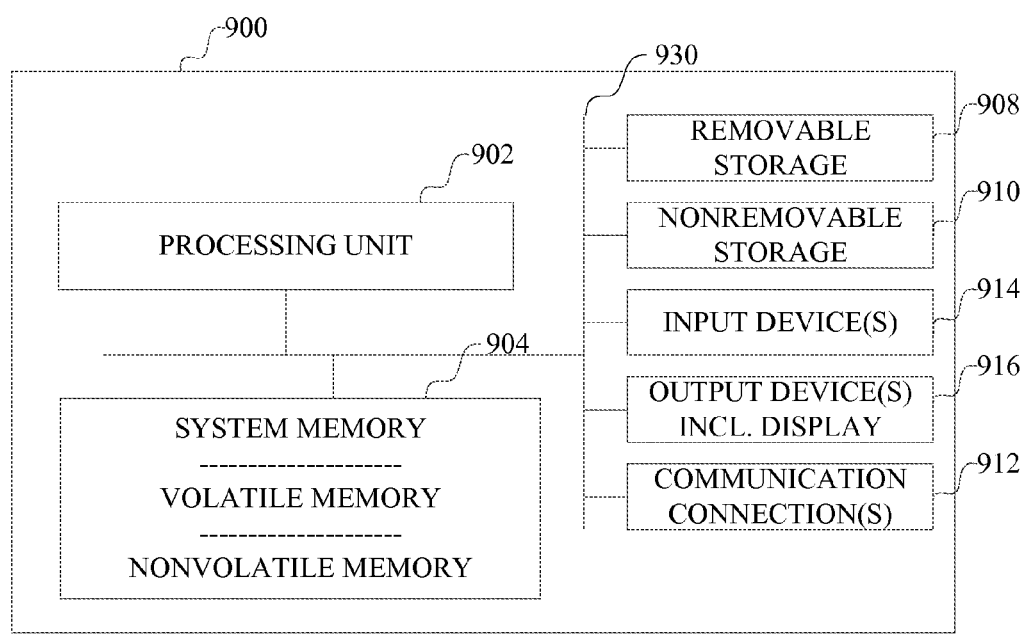
FIG. 9 is block diagram for an example implementation of a general purpose computing device.

Having now described an example implementation, FIG. 9 illustrates an example of a computer with which such techniques can be implemented to provide an analysis computer or an analysis management computer. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

Referring now to FIG. 9, a computer generally incorporates a general purpose computer with computer programs providing instructions to be executed by one or more processors in the computer. Computer programs on a general purpose computer generally include an operating system and applications. The operating system is a computer program running on the computer that manages access to various resources of the computer by the applications and the operating system. The various resources generally include the one or more processors, storage (including memory and storage devices), communication interfaces, input devices and output devices. FIG. 9 illustrates an example of computer hardware of a computer in which an operating system, such as described herein, can be implemented using computer programs executed on this computer hardware. The computer hardware can include any of a variety of general purpose or special purpose computing hardware configurations of the type such as described in FIG. 9.

With reference to FIG. 9, an example computer 900 includes at least one processing unit 902 and memory 904. The computer can have multiple processing units 902 and multiple devices implementing the memory 904. A processing unit 902 can include one or more processing cores (not shown) that operate independently of each other. Additional co-processing units also can be present in the computer, including but not limited to one or more graphics processing units (GPU), one or more digital signal processing units (DSPs) or programmable gate array (PGA) or other device that can be used as a coprocessor. The memory 904 may include volatile devices (such as dynamic random access memory (DRAM) or other random access memory device), and non-volatile devices (such as a read-only memory, flash memory, and the like) or some combination of the two. Other storage, such as dedicated memory or registers, also can be present in the one or more processors. The computer 900 can include additional storage, such as storage devices (whether removable or non-removable) including, but not limited to, magnetically-recorded or optically-recorded disks or tape. Such additional storage is illustrated in FIG. 9 by removable storage device 908 and non-removable storage device 910. The various components in FIG. 9 are generally interconnected by an interconnection mechanism, such as one or more buses 930.

A computer storage medium is any medium in which data can be stored in and retrieved from addressable physical storage locations by the computer. Computer storage media includes volatile and nonvolatile memory, and removable and non-removable storage devices. Memory 904, removable storage 908 and non-removable storage 910 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 900 may also include communications connection(s) 912 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals. Communications connections 912 are devices, such as a wired network interface, wireless network interface, radio frequency transceiver, e.g., Wi-Fi, cellular, long term evolution (LTE) or Bluetooth, etc., transceivers, navigation transceivers, e.g., global positioning system (GPS) or Global Navigation Satellite System (GLONASS), etc., transceivers, that interface with the communication media to transmit data over and receive data from communication media. One or more processes may be running on the processor and managed by the operating system to enable data communication over such connections.

The computer 900 may have various input device(s) 914 such as a keyboard, mouse or other pointer or touch-based input devices, stylus, camera, microphone, sensors, such as accelerometers, thermometers, light sensors and the like, and so on. The computer may have various output device(s) 916 such as a display, speakers, and so on. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 910, communication connections 912, output devices 916 and input devices 914 can be integrated within a housing with the rest of the computer, or can be connected through various input/output interface devices on the computer, in which case the reference numbers 910, 912, 914 and 916 can indicate either the interface for connection to a device or the device itself as the case may be.

A computer generally includes an operating system, which is a computer program running on the computer that manages access to the various resources of the computer by applications. There may be multiple applications. The various resources include the memory, storage, input devices, output devices, and communication devices as shown in FIG. 9.

Figure 10:
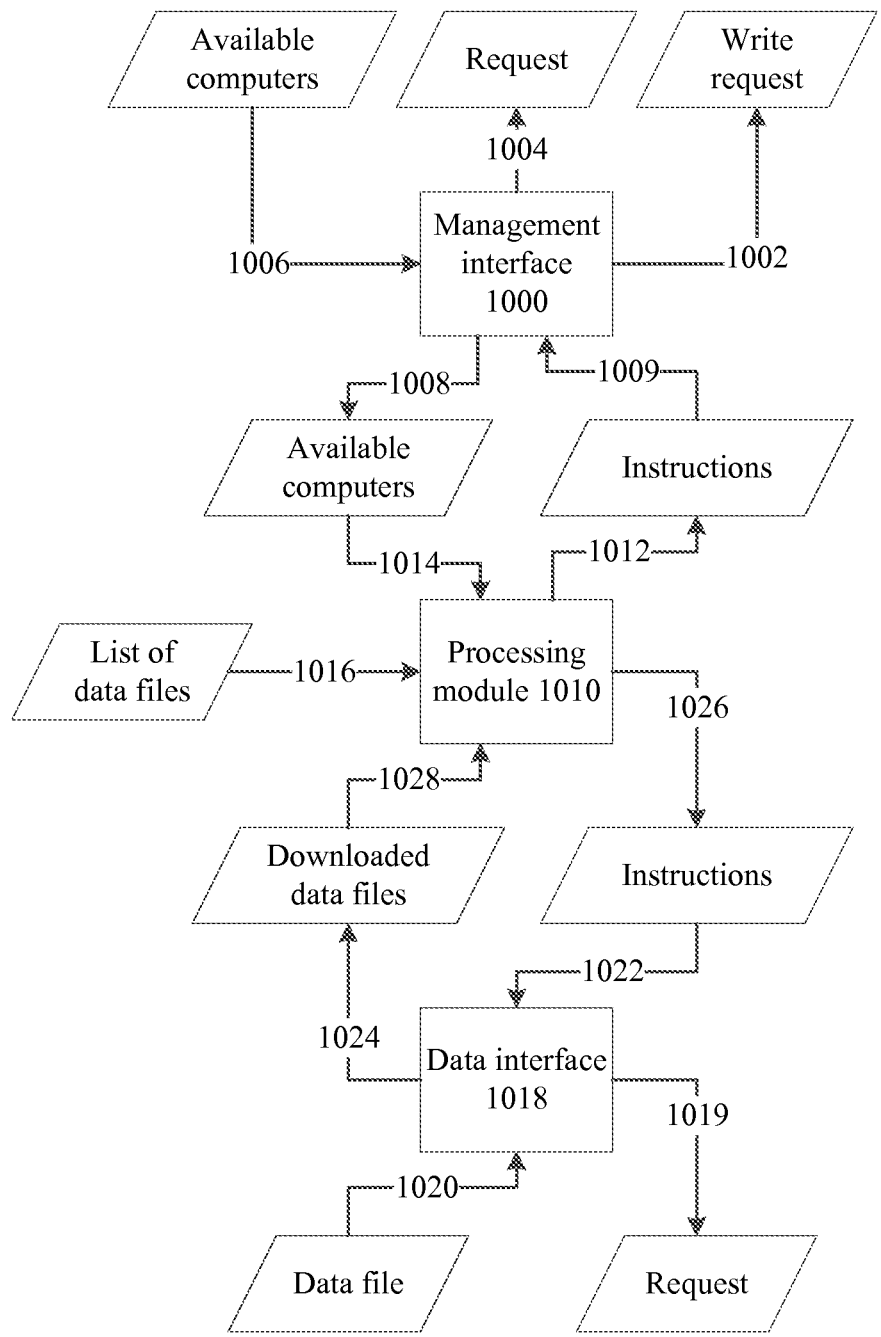
FIG. 10 is a data flow diagram of an example implementation of an analysis computer.

Referring now to FIG. 10, a data flow diagram of an example implementation of an analysis computer will now be described. In this diagram, a parallelogram indicates data, whereas a rectangle indicates a module of the analysis computer that performs processing on the data. A computer such as shown in FIG. 9 can be configured so as to be comprising a management interface 1000 configured to access storage (not shown) to receive the list of data files to be processed in a run and to receive the information about availability of the plurality of analysis computers to participate in the run. The management interface 1000 can be configured to handle communications with an analysis management computer (e.g., 106, FIG. 1) by implementing a communication protocol.

The management interface can have a first output 1002 providing data indicative of the availability of the analysis computer. For example, the management interface can be configured to transmit a write request to the storage to write a file indicative of the availability of the analysis computer. The management interface can have a second output 1004 configured to transmit a request for the list of available analysis computers for a run. The management interface can have an input 1006 configured to receive that list and third output 1008 configured to transfer this list of available analysis computers for a run to a processing module 1010. The management interface can be configured to provide the list of available analysis computers for a run to the processing module in any of a number of ways, such as through an application programming interface, or by providing the data in a data structure in a location in memory.

The management interface 1000 can be configured to be responsive to instructions from the processing module 1010 regarding when to transmit a write file and when to request the list of available analysis computers. For example, the management interface can have a second input 1009 configured to receive such instructions. The processing module and management interface can be implemented to provide an interface for such instructions in a number of ways, such as an application programming interface through which the processing module invokes operations of the management interface.

The processing module 1010 is configured to determine a partition of the list of data files for the analysis computer to download and process for the run based on the requested information about availability of the plurality of analysis computers to participate in the run. For example, the processing module can have a first output 1012 configured to provide instructions to the management interface, based on timing of runs, such as for instructing the management interface to communicate data to storage about availability of the analysis computer for a run and to request the information about the availability of analysis computers for a run. The processing module also can have a first input 1014 configured to receive the list of available computers for a run.

The processing module also can have a second input 1016 configured to receive a list of data files to be processed in a run, from which the analysis computer selects its partition. This list can be received through the management interface 1000, a data interface 1016 or other interface (not shown) through which this information for a run is provided to the analysis computer. For example, the analysis computer can receive this information for a run from an analysis management computer in response to writing data indicating the availability of the analysis computer for the run, in response to request the list of available analysis computers for the run, or at another time prior to downloading the data for the run.

A data interface 1018 is configured to download data files of the determined partition of the list of data files for the run for the analysis computer from the storage to the analysis computer. The data interface 1018 can have a first output 1019 configured to transmit requests to one or more server computers to download a data file. The data interface can have a first input 1020 configured to receive the requested data file. The data interface can have a second input 1022 configured to receive instructions about downloading data files from the processing module, and a second output 1024 configured to provide information about downloaded data files to the processing module. The data interface can be configured to handle communications with a central storage server computer (e.g., 104, FIG. 1) by implementing a communication protocol.

The data interface 1016 can be configured to be responsive to instructions from the processing module 1010 regarding when to request a file and which file to request based on the processing module's determination of the partition of the list of data files to be downloaded and processed by the analysis computer. For example, the processing module 1010 can have a second output 1026 configured to provide such instructions to the data interface. The processing module can have a third input 1028 configured to receive data files downloaded by the data interface. The processing module and data interface can be implemented to provide an interface for such instructions in a number of ways, such as an application programming interface through which the processing module invokes operations of the data interface. The data interface can be configured to provide the downloaded data file for storage on the analysis computer and processing by the processing module in any of a number of ways, such as through an application programming interface, or by storing the downloaded data file at a location in storage.

With the example configuration as shown in FIG. 10, the management interface module can be implemented based on a configuration of the data processing system, such how to access the list of data files, and availability information from a central storage server computer and an analysis management computer over a computer network. The processing module can be implemented based on a kind of processing to be performed on data files in each run. The data interface module can be implemented based on a configuration of the data processing system, such how to access the data files from the central storage server computer over a computer network. An application programming interface between the processing module and the data interface module, and the management interface module and the processing module allow the analysis module to be readily adapted to different data processing system configurations and different kinds of data processing.

The various modules in FIG. 10, as well as any operating system, file system and applications on a computer in FIG. 9, can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data or configure the computer to implement various components or data structures.

Accordingly, in one aspect, an analysis computer is configured to operate in a distributed data processing system comprising a plurality of such analysis computers, the distributed data process system providing storage configured to store a plurality of data files to be processed by the plurality of analysis computers and to store a list of data files to be processed in a run, and to store information about availability of a plurality of analysis computers to participate in the run. The analysis computer comprises a processing system comprising at least one processing unit configured by computer program instructions to access from the storage the information about availability of the plurality of analysis computers to participate in the run. The processing system is further configured to access from the storage the list of data files to be processed in the run. The processing system is further configured to determine a partition of the list of data files to download and process for the run based on the requested information about availability of the plurality of analysis computers to participate in the run.

In another aspect, an analysis computer is configured to operate in a distributed data processing system comprising a plurality of such analysis computers, the distributed data process system providing storage configured to store a plurality of data files to be processed by the plurality of analysis computers and to store a list of data files to be processed in a run, and to store information about availability of a plurality of analysis computers to participate in the run. The analysis computer comprises a management interface configured to access the storage and to receive the list of data files to be processed in the run. The management interface is further configured to access the storage and to receive the information about availability of the plurality of analysis computers to participate in the run. A processing module is configured to determine a partition of the list of data files for the analysis computer to download and process for the run based on the requested information about availability of the plurality of analysis computers to participate in the run. A data interface configured to download data files in the determined partition of the list of data files for the run for the analysis computer from the storage to the analysis computer. The management interface can be configured to provide information to the storage about availability of the analysis computer to participate in a run.

In another aspect, an analysis computer is configured to operate in a distributed data processing system comprising a plurality of such analysis computers, the distributed data process system providing storage configured to store a plurality of data files to be processed by the plurality of analysis computers and to store a list of data files to be processed in a run, and to store information about availability of a plurality of analysis computers to participate in the run. The analysis computer comprises means for accessing the information about availability of the plurality of analysis computers to participate in the run. The analysis computer further comprises means for determining a partition of the list of data files to download and process for the run based on the requested information about availability of the plurality of analysis computers to participate in the run.

In another aspect, a distributed data processing system comprises a plurality of analysis computers. A central storage server computer is configured to store a plurality of data files to be processed by the plurality of analysis computers. The central storage server computer can be connected to a computer network and is operative in response to requests from the plurality of analysis computers received over the computer network to allow requested data files from among the plurality of data files to be downloaded by the plurality of analysis computers from the central storage server computer. An analysis management computer can be connected to a computer network and is operative in response to requests from the plurality of analysis computers to provide the list of data files on the central storage server computer to be downloaded in a run for processing by the plurality of analysis computers. An analysis computer is configured, for each run, to transmit information to the analysis management computer, at a beginning of the run, about availability of the analysis computer to participate in the run. An analysis computer is configured to request from the analysis management computer the information about availability of the plurality of analysis computers to participate in the run. The analysis computer accesses the list of data files to be processed in the run. The analysis computer determines a partition of the list of data files to download and process for the run based on the requested information about availability of the plurality of analysis computers to participate in the run.

In one aspect, a distributed processing system comprises a plurality of analysis computers and a central storage server computer. The central storage server computer is configured to store a plurality of data files to be processed by the plurality of analysis computers. First storage accessible by the plurality of analysis computers is configured to store a list of data files to be downloaded from the central storage server computer. Second storage accessible by the plurality of analysis computers also is configured. The first and second storage can reside on separate computers or on a same computer. The first and second storage can reside on the central storage server computer or an analysis computer from among the plurality of analysis computers. The first and second storage can reside on another computer separate from the analysis computers and the central storage server computer. An analysis computer includes a means for transmitting, at a beginning of a run, information to the second storage indicating availability of the analysis computer to participate in the run. The analysis computer includes a means for reading, from the second storage, the information about availability of the plurality of analysis computers available to participate in the run. The analysis computer further includes a means for determining a partition of the list of data files to be downloaded and processed by the analysis computer using the information about availability of the plurality of analysis computers available to participate in the run.

In one aspect, a computer program product comprises a computer readable storage medium comprising at least one of a memory device and a storage device, with computer program instructions encoded on the computer readable storage medium which, when processed by an analysis computer, configure the analysis computer to participate in distributed processing system. The distributed processing system comprises a plurality of the analysis computers, a central storage server computer configured to store a plurality of data files to be processed by the plurality of analysis computers and being connected to a computer network and operative in response to requests from the plurality of analysis computers received over the computer network to allow requested data files from among the plurality of data files to be downloaded by the plurality of analysis computers from the central storage server computer. The computer program instructions further configuring the analysis computer to, for each run, at a beginning of the run, transmit information about availability of the analysis computer to participate in the run to the analysis management computer; request from the analysis management computer the information about availability of the plurality of analysis computers to participate in the run; access the list of data files to be processed in the run; and determine a partition of the list of data files to download and process for the run based on the requested information about availability of the plurality of analysis computers to participate in the run.

In another aspect, a plurality of analysis computers performs a process for distributed data processing of data from a central storage server computer configured to store a plurality of data files. The central storage server computer can be connected to a computer network and operative in response to requests from the plurality of analysis computers received over the computer network to allow requested data files from among the plurality of data files to be downloaded by the plurality of analysis computers from the central storage server computer. An analysis management computer can be connected to a computer network and operative in response to requests from the plurality of analysis computers to provide a list of data files to be processed in a run by the plurality of analysis computers and information about available analysis computers for the run. The process, performed by an analysis computer for each run, comprises, at a beginning of the run, transmitting information about availability of the analysis computer to participate in the run to the analysis management computer. The analysis computer requests from the analysis management computer the information about availability of the plurality of analysis computers to participate in the run. The analysis computer accesses the list of data files to be processed in the run. The analysis computer determines a partition of the list of data files to download and process for the run based on the requested information about availability of the plurality of analysis computers to participate in the run.

In any of the foregoing aspects, the analysis computer is further configured to download and process the data files in the partition for the analysis computer.

In any of the foregoing aspects, the plurality of data files can comprise log files for a plurality of server computers.

In any of the foregoing aspects, the central storage server computer can be configured to receive data logs from a plurality of server computers, and the plurality of data files can comprises the received data logs.

In any of the foregoing aspects, the information about availability of the analysis computer comprises a file written to storage in a directory for the run.

In any of the foregoing aspects, the analysis computer can be configured to update the list of data files with state information about download of data files by the analysis computer.

In any of the foregoing aspects, the analysis computer can be configured to update the list of data files with state information about processing of data files by the analysis computer.

In any of the foregoing aspects, to determine the partition, the analysis computer can be further configured to determine a rank of the analysis computer among the plurality of analysis computers available to participate in the run, and determine a partition based on the determined rank.

In any of the foregoing aspects, the analysis computer can be further configured to request for download the data files corresponding to the determined partition.

In any of the foregoing aspects, if transmitting information about availability of the analysis computer comprises writing a file to storage in a directory for the run, determining rank can comprise sorting the files written to the storage.

The rank for an analysis computer can be determined as an order in the sorted files of the file written by the analysis computer.

In any of the foregoing aspects, the analysis management computer can be connected to a computer network and operative in response to requests from the plurality of analysis computers to provide the list of data files to be processed in a run by the plurality of analysis computers.

In any of the foregoing aspects, the analysis management computer can reside on a same computer as a central storage server computer.

In any of the foregoing aspects, the analysis management computer can reside on a same computer as an analysis computer.

In any of the foregoing aspects, the analysis computer can be configured to determine a current time, and to determine whether to participate in a current run based on the current time.

In any of the foregoing aspects, the set of data files to be processed by the analysis computer reside on a single storage server computer.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. An analysis computer configured to operate in a distributed data processing system comprising a plurality of such analysis computers, the distributed data process system providing storage configured to store a plurality of data files to be processed by the plurality of analysis computers and to store a list of data files to be processed in a run, and to store information about availability of a plurality of analysis computers to participate in the run, the analysis computer comprising:
   a management interface configured to access the storage and to receive the list of data files to be processed in the run;
   the management interface being further configured to access the storage and to receive the information about availability of the plurality of analysis computers to participate in the run;
   a processing module configured to determine a partition of the list of data files for the analysis computer to download and process for the run based on the requested information about availability of the plurality of analysis computers to participate in the run; and
   a data interface configured to download data files in the determined partition of the list of data files for the run for the analysis computer from the storage to the analysis computer.

2. The analysis computer of claim 1, wherein the plurality of data files comprises data logs of a plurality of server computers.

3. The analysis computer of claim 1, wherein the information about availability of the plurality of analysis computers comprises a file written to the storage in a directory for the run by each of the available analysis computers.

4. The analysis computer of claim 1, wherein the processing system of the analysis computer is further configured to update the list of data files with state information about download of data files by the analysis computer.

5. The analysis computer of claim 1, wherein the processing system of the analysis computer is further configured to update the list of data files with state information about processing of data files by the analysis computer.

6. The analysis computer of claim 1, wherein to determine the partition, the processing system is further configured to determine a rank of the analysis computer among the plurality of analysis computers available to participate in the run and determine a partition based on the determined rank.

7. The analysis computer of claim 1 further configured to request for download, from the central storage server computer, the data files corresponding to the determined partition.

8. A process for distributed data processing by a plurality of analysis computers, the plurality of analysis computers processing data from a central storage server computer configured to store a plurality of data files, the central storage server computer being connected to a computer network and operative in response to requests from the plurality of analysis computers received over the computer network to allow requested data files from among the plurality of data files to be downloaded by the plurality of analysis computers from the central storage server computer, and an analysis management computer connected to a computer network and operative in response to requests from the plurality of analysis computers to provide a list of data files to be processed in a run by the plurality of analysis computers and information about available analysis computers for the run, the process, being performed by each of the plurality of analysis computers for each run, comprising:
   at a beginning of the run, transmitting information about availability of the analysis computer to participate in the run to the analysis management computer;
   requesting from the analysis management computer the information about availability of the plurality of analysis computers to participate in the run;
   accessing the list of data files to be processed in the run; and
   determining a partition of the list of data files to download and process for the run based on the requested information about availability of the plurality of analysis computers to participate in the run.

9. The process of claim 8, wherein the central storage server computer is configured to receive data logs from a plurality of server computers, and the plurality of data files comprises the received data logs.

10. The process of claim 8, wherein transmitting the information about availability of the analysis computer comprises writing a file to storage of the analysis management computer in a directory for the run.

11. The process of claim 8, further comprising:
   the analysis computer updating the list of data files on the analysis management computer with state information about download of data files by the analysis computer.

12. The process of claim 8, further comprising:
   the analysis computer updating the list of data files on the analysis management computer with state information about processing of data files by the analysis computer.

13. The process of claim 8, wherein determining the partition comprises:

determining a rank of the analysis computer among the plurality of analysis computers available to participate in the run; and determining a partition based on the determined rank.

14. The process of claim 13, wherein transmitting the information about availability of the analysis computer comprises writing a file to storage of the analysis management computer in a directory for the run; and wherein determining the rank comprises sorting the files written to the storage of the analysis management computer and determining, as the rank for an analysis computer, an order in the sorted files of file written by the analysis computer.

15. A distributed data processing system, comprising:

a plurality of analysis computers;

a central storage server computer configured to store a plurality of data files to be processed by the plurality of analysis computers, the central storage server computer being connected to a computer network and operative in response to requests from the plurality of analysis computers received over the computer network to allow requested data files from among the plurality of data files to be downloaded by the plurality of analysis computers from the central storage server computer;

an analysis management computer connected to a computer network and operative in response to requests from the plurality of analysis computers to provide the list of data files on the central storage server to be downloaded in a run for processing by the plurality of analysis computers;

each of the plurality of analysis computers being configured to, at a beginning of each run, transmit information about availability of the analysis computer to participate in the run to the analysis management computer;

each analysis computer being further configured to request from the analysis management computer the information about availability of the plurality of analysis computers to participate in the run;

each analysis computer being further configured to access the list of data files to be processed in the run; and each analysis computer being further configured to determine a partition of the list of data files to download and process for the run based on the requested information about availability of the plurality of analysis computers to participate in the run.

16. The distributed processing system of claim 15, wherein the central storage server computer is configured to receive data logs from a plurality of server computers, and the plurality of data files comprises the received data logs.

17. The distributed processing system of claim 15, wherein the information about availability of the analysis computer comprises a file written to storage of the analysis management computer in a directory for the run.

18. The distributed processing system of claim 15, wherein the analysis computer is configured to update the list of data files on the analysis management computer with state information about download of data files by the analysis computer.

19. The distributed processing system of claim 15, wherein the analysis computer is configured to update the list of data files on the analysis management computer with state information about processing of data files by the analysis computer.

20. The distributed processing system of claim 15, wherein to determine the partition, the analysis computer is further configured to:

determine a rank of the analysis computer among the plurality of analysis computers available to participate in the run; and determine a partition based on the determined rank.

* * * * *